(12) United States Patent
Rix et al.

(10) Patent No.: US 10,558,737 B2
(45) Date of Patent: Feb. 11, 2020

(54) GENERATING A SEMANTIC DIFF

(71) Applicant: Github, Inc., San Francisco, CA (US)

(72) Inventors: Rob Rix, San Francisco, CA (US);
Rick Winfrey, San Francisco, CA (US);
Joshua Evan Vera, Brookyn, NY (US);
Timothy Evan Clem, San Francisco, CA (US)

(73) Assignee: GITHUB, INC., San Francisco, CA (US)

( * ) Notice: Subject to any disclaimer, the term of this patent is extended or adjusted under 35 U.S.C. 154(b) by 22 days.

(21) Appl. No.: 15/653,746

(22) Filed: Jul. 19, 2017

(65) Prior Publication Data

US 2019/0026255 A1 Jan. 24, 2019

(51) Int. Cl.
*G06F 17/22* (2006.01)
*G06F 16/31* (2019.01)
*G06F 17/27* (2006.01)

(52) U.S. Cl.
CPC ........ *G06F 17/2247* (2013.01); *G06F 16/322* (2019.01); *G06F 17/271* (2013.01)

(58) Field of Classification Search
None
See application file for complete search history.

(56) References Cited

U.S. PATENT DOCUMENTS

| | | | |
|---|---|---|---|
| 7,630,879 B2 | 12/2009 | Liu | |
| 8,286,132 B2 | 10/2012 | Yuan et al. | |
| 8,336,030 B1 * | 12/2012 | Boissy | G06F 8/71 717/122 |
| 9,292,491 B2 | 3/2016 | Sikstrom et al. | |
| 2010/0088676 A1 * | 4/2010 | Yuan | G06F 17/2288 717/120 |
| 2014/0279843 A1 * | 9/2014 | Von Weihe | G06F 17/2288 707/608 |
| 2014/0309989 A1 * | 10/2014 | Sikstrom | G06F 17/2785 704/9 |

(Continued)

OTHER PUBLICATIONS

"International Application Serial No. PCT US2018 041217, International Search Report dated Sep. 25, 2018", 2 pgs.

(Continued)

*Primary Examiner* — Sanchita Roy
(74) *Attorney, Agent, or Firm* — Workman Nydegger

(57) ABSTRACT

Generation of a semantic diff is described. A machine according to some example embodiments generates first and second parse trees by parsing the first and second documents using a grammar of a coding language common to both documents. The machine classifies subtrees within these parse trees and determines that a first subtree from the first document shares a classification with a second subtree from the second document. Based on their sharing of the classification, the machine selects these two subtrees for comparison to each other and also chooses a comparison procedure based on the shared classification. The machine then executes the selected comparison procedure with the selected two subtrees as input and generates a differential subtree that indicates one or more differences between the two subtrees. The machine may also generate a differential tree that indicates differences between the entireties of the first and second documents.

25 Claims, 10 Drawing Sheets

(56) References Cited

U.S. PATENT DOCUMENTS

2016/0210354 A1  7/2016  Wijnen et al.

OTHER PUBLICATIONS

"International Application Serial No. PCT US2018 041217, Written Opinion dated Sep. 25, 2018", 8 pgs.

Campello, "A similarity-based approach to match elements across versions of XML documents", 29th SBBD—SBBD Proceedings—ISSN 2316-5170, [Online] Retrieved from the internet:https: pdfs.semanticscholar.org 05fd 438a2f3c9a334bf1501e69b3ff08475298a6.pdf, (Sep. 10, 2014).

"Le-Moulin-Studio / Java-Semantic Diff", Taken from the Internet at least as early as Jul. 7, 2016 and found at: https://github.com/le-moulin-studio/java-semantic-diff, 2 pgs.

"Semantic Intro Guide", Taken from the Internet at least as early on Jul. 7, 2016 and found at: https://www.semanticmerge.com/documentation/intro-guide/semanticmerge-intro-guide.shtml, 17 pgs.

"Semantic Version Control", Taken from the Internet at least as early as Jul. 7, 2016 and found at https://www.plasticscm.com/features/semantic-version-control.html, 10 pgs.

Bridgwater, Adrian, "SemanticMerge is First Language-Aware Diff and Merge Tool", Taken from Internet on Dr. Dobb's webpage and found at : http://www.drdobbs.com/tools/semanticmerge-is-first-language-aware-di/240162814, (Jan. 18, 2013), 4.

Cohen, Bram, "", Patient Diff Advantages, Live Journal, 2010. 3 pgs.

Dietrich, Erik, "Merging Done Right: Semantic Merge", Blog, DaedTech, taken from the Internet at least as early as Jul. 8, 2016 and found at: . http://www.daedtech.com/merging-done-right-semantic-merge/, 8 pgs.

Myers, Eugene W., "An O(ND) Difference Algorithm and Its Variations", Department of Computer Science, University of Arizona, Tucson, 1986. 15 pgs.

\* cited by examiner

US 10,558,737 B2

GENERATING A SEMANTIC DIFF

TECHNICAL FIELD

The subject matter disclosed herein generally relates to the technical field of special-purpose machines that facilitate analysis of electronic documents, including software-configured computerized variants of such special-purpose machines and improvements to such variants, and to the technologies by which such special-purpose machines become improved compared to other special-purpose machines that facilitate analysis of electronic documents. Specifically, the present disclosure addresses systems and methods to facilitate generation of information that indicates semantic differences between analyzed electronic documents.

BACKGROUND

One or more electronic documents (e.g., text documents, such as text files) can be stored by a data repository (e.g., a database). Such a document may be written in a coding language that encodes the information contained within the document, and in some situations, different portions of a single document may be written in different coding languages. Where two or more documents are at least partially written in a coding language that is shared in common, it may be helpful to analyze and compare such documents such that differences may be made known (e.g., easily seen or highlighted) to one or more users. As one example, the "diff" command in Linux can be invoked to compare two text files, line by line and character by character. The output of this command indicates textual differences between the two files and can be described as a "differential" report of the two files, as a "diff output" for the two files, or as a "diff" of the two files.

BRIEF DESCRIPTION OF THE DRAWINGS

Some embodiments are illustrated by way of example and not limitation in the figures of the accompanying drawings.

DETAILED DESCRIPTION

Figure 1:
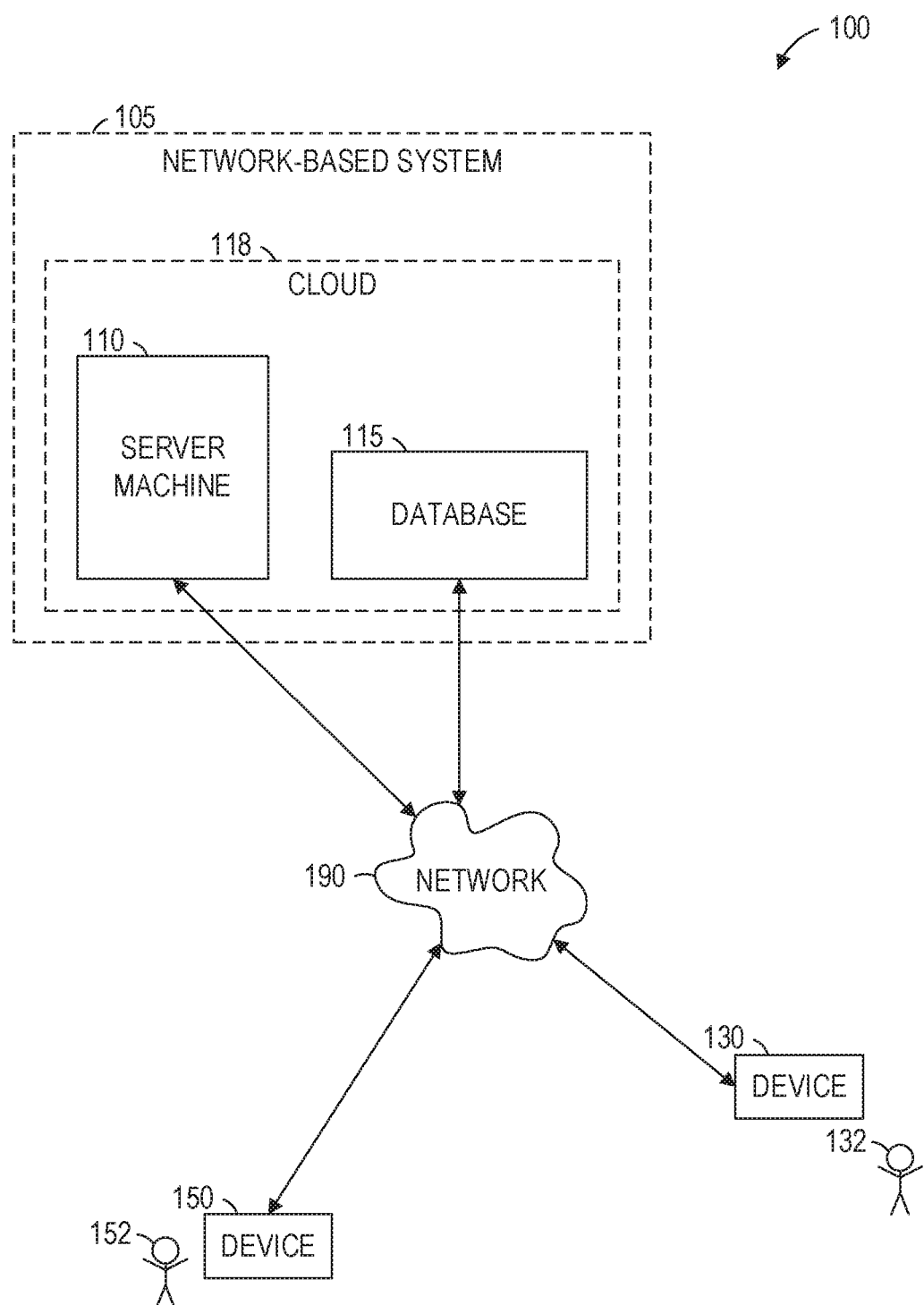
FIG. 1 is a network diagram illustrating a network environment suitable for fully or partially generating a semantic diff of multiple documents, according to some example embodiments.

Example methods (e.g., algorithms) facilitate full or partial generation and full or partial presentation of a semantic diff of multiple documents, and example systems (e.g., special-purpose machines configured by special-purpose software) are configured to facilitate full or partial generation and full or partial presentation of a semantic diff of multiple documents. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a server machine or a device) is configured to access first and second documents (e.g., text documents) written in a coding language that is common to both. The access of these documents may be in response to a user request for provision of a semantic differential report (e.g., a semantic diff) that indicates differences (e.g., textual differences) between the first and second documents. The machine generates first and second parse trees by parsing the first and second documents based on a grammar of the coding language. The resulting first parse tree includes a first group (e.g., plurality) of subtrees, and the resulting second parse tree includes a second group of subtrees.

The machine classifies the subtrees in the first and second groups and determines that one of the subtrees (e.g., a first subtree) in the first group shares a classification with one of the subtrees (e.g., second subtree) in the second group. Based on this determination that a subtree in the first group matches with a subtree in the second group, the machine selects these two subtrees for comparison to each other. Furthermore, the machine selects a comparison procedure for comparing the selected two subtrees, and the selecting of the comparison procedures is based on the classification that is shared in common by these two selected subtrees.

The machine then executes the selected comparison procedure with the selected two subtrees as input and generates a differential subtree that indicates one or more differences (e.g., textual differences) between the two subtrees (e.g., the first subtree from the first group and the second subtree from the second group). The machine may go on and generate a differential tree that indicates differences between the entireties of the first and second documents. Furthermore, the machine may cause presentation of a graphical representation of at least a portion of the generated differential tree. This may be performed in response (e.g., fulfillment) to the user request for provision of the semantic differential report. Further details are discussed below.

FIG. 1 is a network diagram illustrating a network environment suitable for fully or partially generating a semantic diff of multiple documents, according to some example embodiments. The network environment 100 includes a server machine 110, a database 115, and devices 130 and 150, all communicatively coupled to each other via a network 190. The server machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The server machine 110 and the devices 130 and 150 may each be implemented in a special-purpose (e.g., specialized) computer system, in whole or in part, as described below with respect to FIG. 10.

As discussed below, the server machine 110 may be configured to perform all or part of any one or more of the methodologies discussed herein. In some alternative example embodiments, the device 130 is configured to perform all or part of any one or more of the methodologies discussed herein. In some hybrid example embodiments, one or more the methodologies discussed herein are partially performed by the server machine 110 and partially performed by the device 130

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store one or more data structures, for example, in the form of data that has been structured or otherwise arranged as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
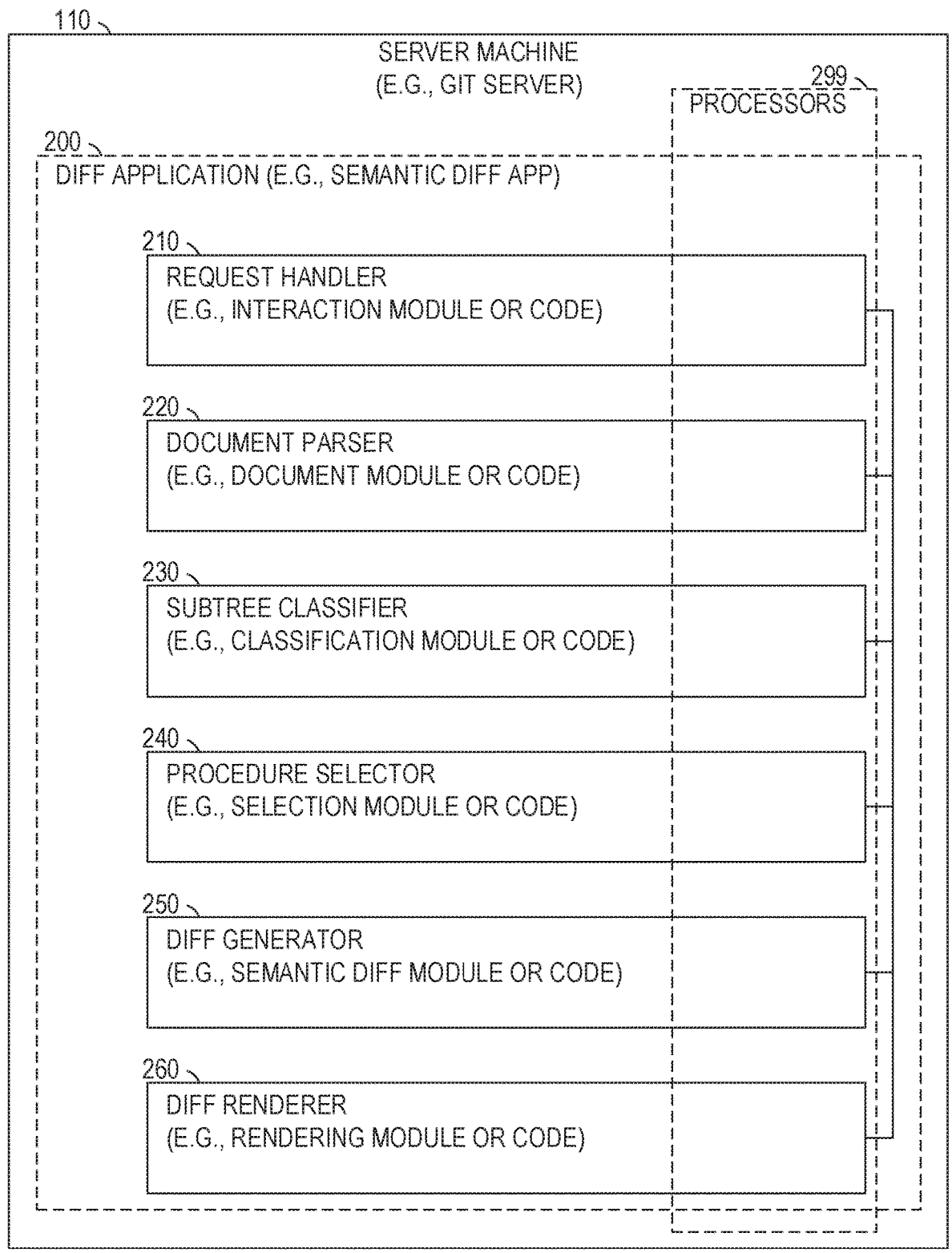
FIG. 2 is a block diagram illustrating components of a server machine suitable for fully or partially generating a semantic diff of multiple documents, according to some example embodiments.

FIG. 2 is a block diagram illustrating components of the server machine 110, according to some example embodiments. The server machine 110 is shown as including a request handler 210, a document parser 220, a subtree classifier 230, a procedure selector 240, a diff generator 250, and a diff renderer 260, all configured to communicate with each other (e.g., via a bus, shared memory, or a switch).

The request handler 210 may be or include an interaction module (e.g., a user interaction management module) or equivalent software code. The document parser 220 may be or include a document module (e.g., a document parsing module) or equivalent software code. The subtree classifier 230 may be or include a classification module (e.g., a subtree classification module) or equivalent software code. The procedure selector 240 may be or include a selection module (e.g., a procedure selection module) or equivalent software code. The diff generator 250 may be or include a semantic diff module (e.g., a semantic diff generation module) or equivalent software code. The diff renderer 260 may be or include a rendering module (e.g., a semantic differential report rendering module) or equivalent software code.

As shown in FIG. 2, the request handler 210, the document parser 220, the subtree classifier 230, the procedure selector 240, the diff generator 250, the diff renderer 260, or any suitable combination thereof, may form all or part of a diff application 200 (e.g., a server-side application for providing semantic diff services to one or more devices) that is stored (e.g., installed) on the server machine 110 and executable thereon. Furthermore, one or more processors 299 (e.g., hardware processors, digital processors, or any suitable combination thereof) may be included (e.g., temporarily or permanently) in the diff application 200, the request handler 210, the document parser 220, the subtree classifier 230, the procedure selector 240, the diff generator 250, the diff renderer 260, or any suitable combination thereof.

Figure 3:
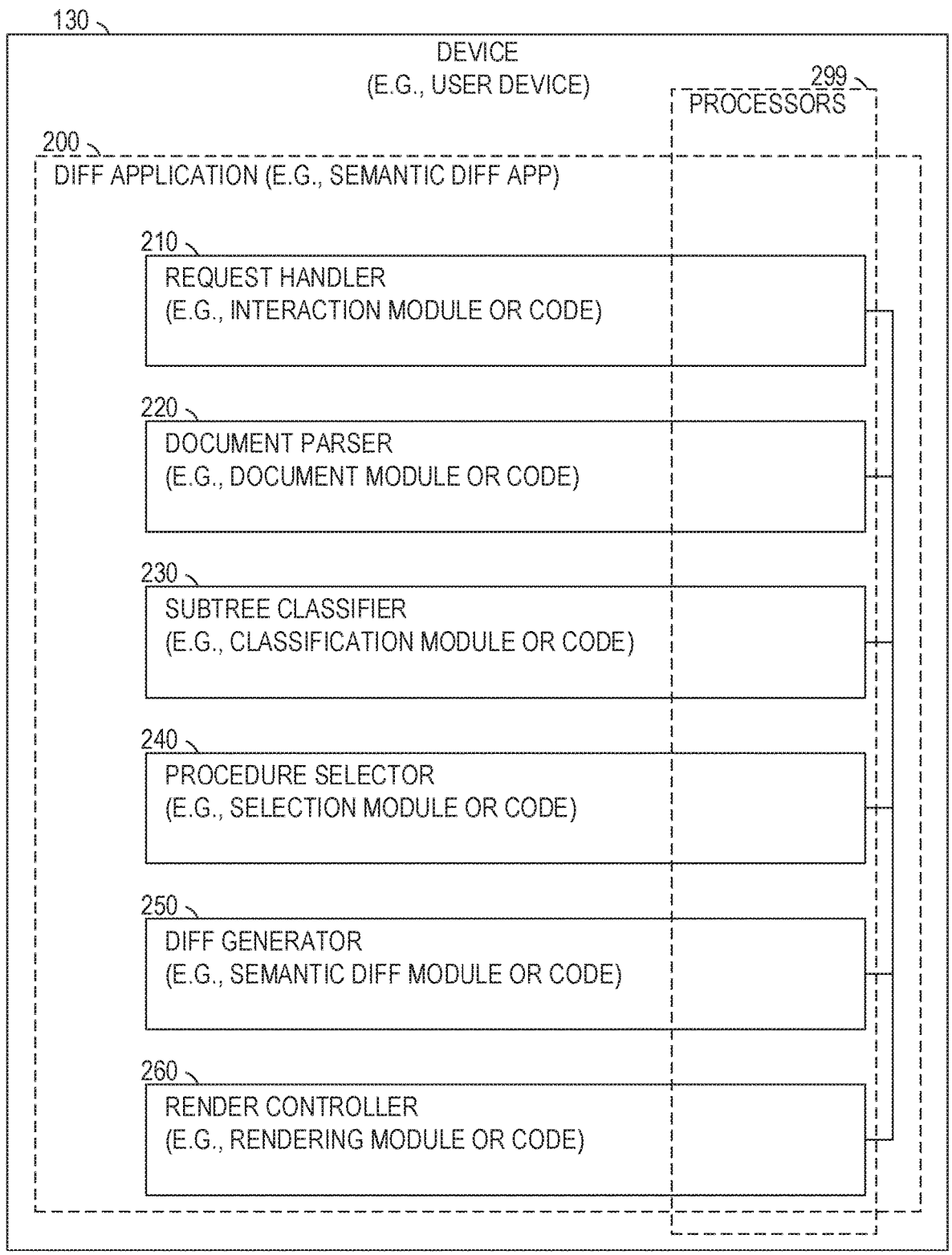
FIG. 3 is a block diagram illustrating components of a device suitable for fully or partially generating a semantic diff of multiple documents, according to some example embodiments.

FIG. 3 is a block diagram illustrating components of the device 130, according to some example embodiments. The device 130 is shown as including the request handler 210, the document parser 220, the subtree classifier 230, the procedure selector 240, the diff generator 250, and the diff renderer 260, all configured to communicate with each other (e.g., via a bus, shared memory, or a switch).

As shown in FIG. 3, the request handler 210, the document parser 220, the subtree classifier 230, the procedure selector 240, the diff generator 250, the diff renderer 260, or any suitable combination thereof, may form all or part of the diff application 200 (e.g., a client-side application for generating and presenting a semantic diff) that is stored (e.g., in memory, installed, or otherwise present) on the device 130 and executable thereon. As noted above, one or more processors 299 (e.g., hardware processors, digital processors, or any suitable combination thereof) may be included (e.g., temporarily or permanently) in the diff application 200, the request handler 210, the document parser 220, the subtree classifier 230, the procedure selector 240, the diff generator 250, the diff renderer 260, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 4:
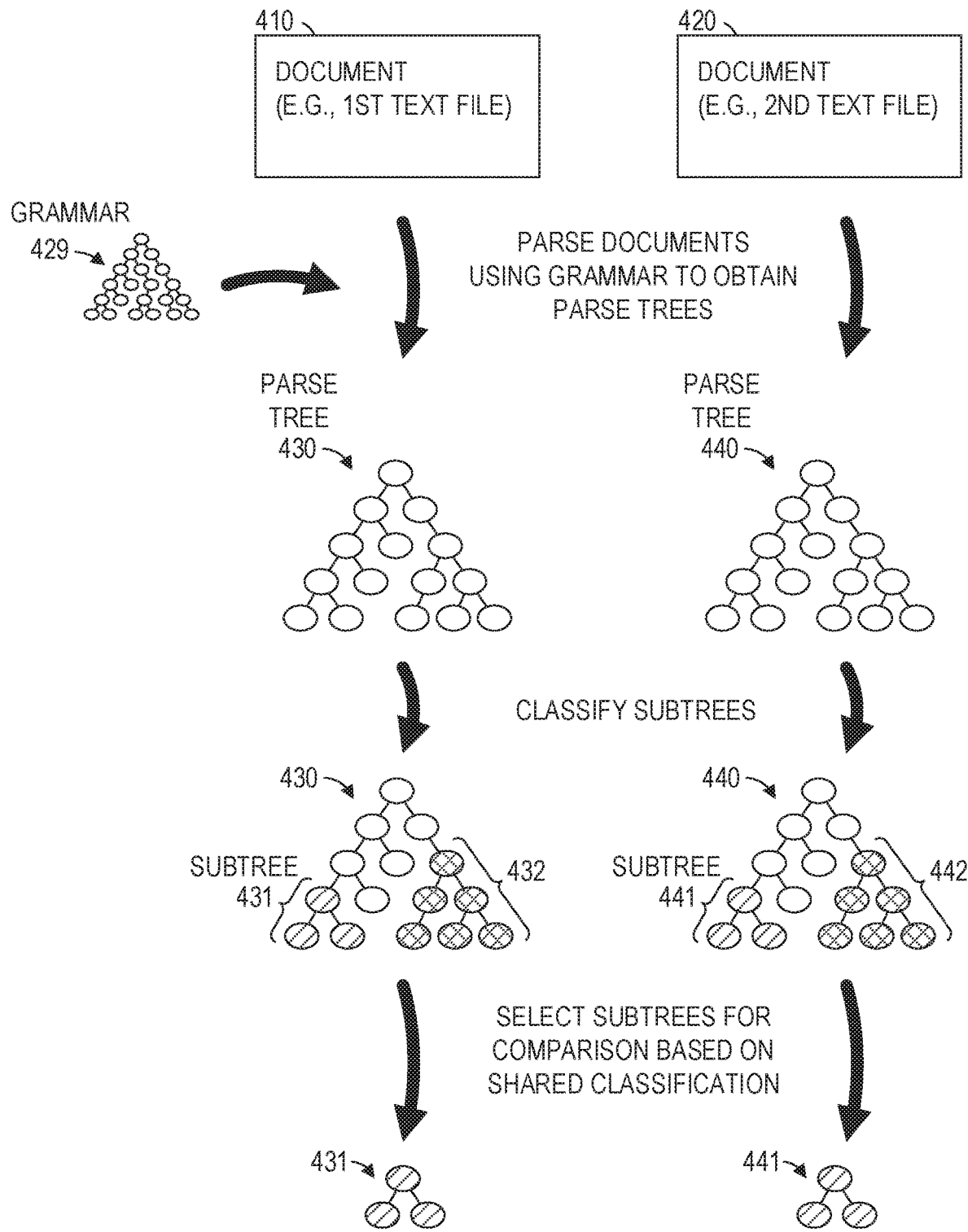
FIGS. 4 and 5 are conceptual diagrams illustrating generation of a differential tree (e.g., a diff tree) that indicates differences between two documents, according to some example embodiments.
Figure 5:
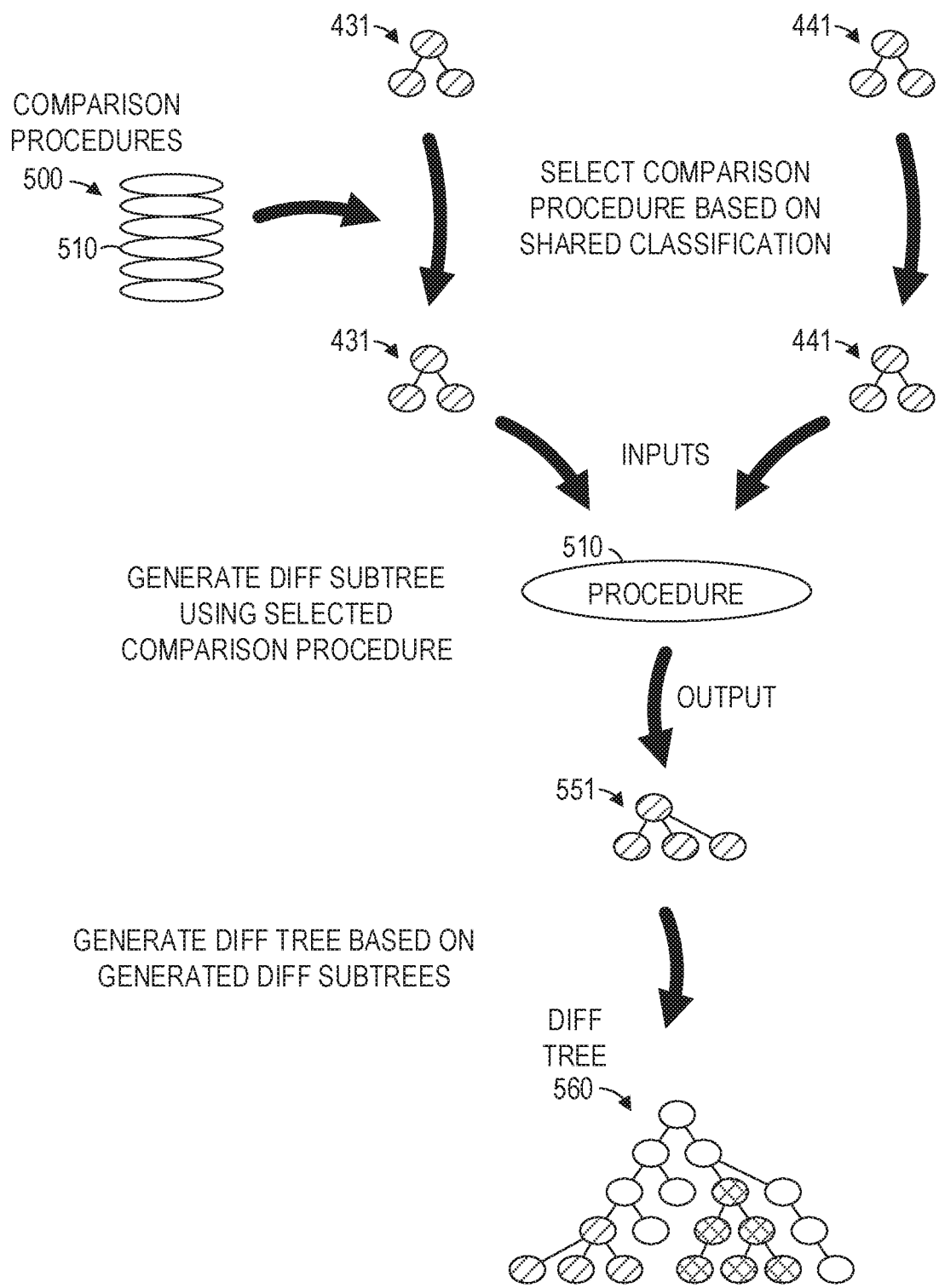

FIGS. 4 and 5 are conceptual diagrams illustrating generation of a differential tree (e.g., a diff tree) that indicates differences between two documents, according to some example embodiments. Starting at the top of FIG. 4, a first document 410 may be a first electronic document in the example form of a first text file (e.g., a first file that stores human-readable text characters), and a second document 420 may be a second electronic document in the example form of a second text file (e.g., a second file that stores human-readable text characters). The server machine 110 or the device 130 parses the first and second documents 410 and 420 based on a grammar 429, where the grammar 429 corresponds to a coding language (e.g., a protocol in which a specification of the coding language defines a syntax for encoding content as human-readable text, machine-readable text, or any suitable combination thereof) that is common to both the first and second documents 410 of 420. As shown by the heavy arrows in FIG. 4, the results of the parsing include a first parse tree 430 that corresponds to the first document 410, as well as a second parse tree 440 that corresponds to the second document 420.

The server machine 110 or the device 130 next classifies some or all of the subtrees within the parse trees 430 and 440. The classifying of the subtrees may be based on a set of classifications maintained by (e.g., stored at, updated by, or both) the server machine 110, the database 115, the device 130, or any suitable combination thereof. With at least some of the subtrees thus classified, the server machine 110 or the device 130 determines that a first subtree 431 in the first parse tree 430 matches with a second subtree 441 in the second parse tree 440. That is, the server machine 110 or the device 130 determines that the first subtree 431 shares a classification (e.g., a first classification) with the second subtree 441, where the shared classification is included in the set of classifications (e.g., as maintained by the server machine 110). Similarly, the server machine 110 or the device 130 may determine that a third subtree 432 in the first parse tree 430 shares a classification (e.g., a second classification) with a fourth subtree 442 in the second parse tree 440.

With reference to the bottom portion of FIG. 4, once it has been determined that the first and second subtrees 431 and 441 have a shared classification (e.g., the first classification) in common, the server machine 110 or the device 130 selects the first and second subtrees 431 and 441 for comparison to each other. This selection is based on the previous determination that the first and second subtrees 431 and 441 both have the shared classification. Similarly, the server machine or the device 130 may select the third and fourth subtrees 432 and 442 for comparison to each other, and this selection may be based on a previous determination that the third or fourth subtrees 432 and 442 share the same classification (e.g., a second classification).

As shown at the top of FIG. 5, the server machine 110 or the device 130 then selects a comparison procedure 510 (e.g., a first comparison procedure) that is applicable to the first and second subtrees 431 and 441, and this selection is made from a group (e.g., plurality) of available comparison procedures 500. In addition, this selection is performed based on the classification (e.g., the first classification) that is shared in common by the first and second subtrees 431 and 441. Similarly, the server machine 110 or the device 130 may select a comparison procedure (e.g., a second comparison procedure, also from the group of comparison procedures 500) applicable to the third and fourth subtrees 432 and 442, based on the classification (e.g., the second classification) shared by the third and fourth subtrees 432 and 442.

As shown in the center portion of FIG. 5, the machine 110 or the device 130 executes the selected comparison procedure 510, with the selected first and second subtrees 431 and 441 as inputs to the comparison procedure 510, to generate a differential subtree 551 (e.g., a diff subtree) as an output of the selected comparison procedure 510. The generated differential subtree 551 indicates at least one difference (e.g., difference in text) between the selected first subtree 431 and the selected second subtree 441.

As shown in the lower portion of FIG. 5, the server machine 110 or the device 130 may go on to generate a differential tree 560 (e.g., a diff tree) that includes the generated differential subtree 551. The generated differential tree indicates one or more differences (e.g., text differences) between pairs of corresponding subtrees (e.g., between the first and second subtrees 431 and 441, or between the third and fourth subtrees 432 and 442), where each pair of subtrees includes one subtree (e.g., first subtree 431) parsed from the first document 410 and one subtree (e.g., second subtree 441) parsed from the second document 420. All or part of the generated diff tree 560 may be presented (e.g., in a graphical representation, such as a rendered image) by the device 130 or cause to be presented by the device 130 (e.g., within a graphical user interface) for viewing by the user 132 of the device 130.

Figure 6:
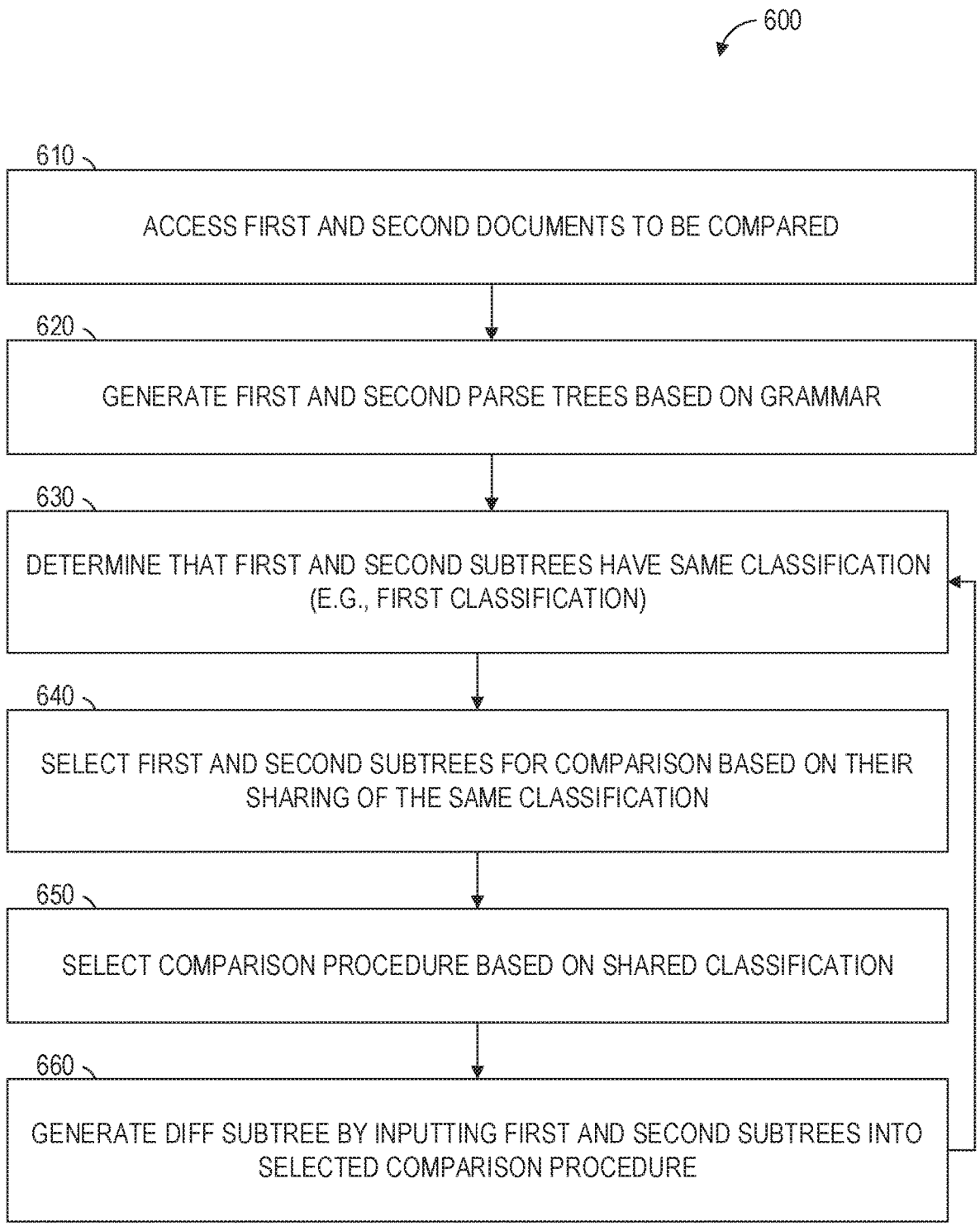
FIGS. 6-9 are flowcharts illustrating operations of a machine in performing a method of fully or partially generating a semantic diff of two documents, according to some example embodiments.

FIGS. 6-9 are flowcharts illustrating operations in performing a method 600 of fully or partially generating a semantic diff, according to some example embodiments. Operations in the method 600 may be performed by the server machine 110, by the device 130, or by a combination of both, using components described above with respect to FIGS. 2 and 3, using one or more processors (e.g., microprocessors or other hardware processors), or using any suitable combination thereof. As shown in FIG. 6, the method 600 includes operations 610, 620, 630, 640, 650, and 660.

In operation 610, the request handler 210 accesses the first document 410 and accesses the second document 420. The first and second documents 410 and 420 may be text documents and may be accessed from a data repository (e.g., database 115, server machine 110, device 150, or device 130). Furthermore, the first and second documents 410 and 420 may both be at least partially (e.g., fully) written in a coding language (e.g., a coding language that is common to both documents).

In operation 620, the document parser 220 generates the first parse tree 430 based on (e.g., by parsing, with or without further processing) the first document 410, and the document parser 220 generates a second parse tree 440 based on (e.g., by parsing, with or without further processing) the second document 420. For example, the document parser 220 may parse the first and second documents 410 and 420 based on (e.g., in accordance with or otherwise using) the grammar 429 of the coding language that is common to both the first and second documents 410 and 420.

According to various example embodiments, the grammar 429 may be accessed from a data repository (e.g., database 115, server machine 110, device 150, or device 130) for use during operation 620. As noted above, the generated first parse tree 430 includes a first group (e.g., first plurality) of subtrees that have been parsed from the accessed first document 410, and the generated second parse tree 440 includes a second group (e.g., second plurality) of subtrees that have been parse from the accessed second document 420.

In operation 630, the subtree classifier 230 determines that one of the subtrees in the first group of subtrees shares a classification with one of the subtrees in the second group of subtrees. For example, the subtree classifier 230 may determine that the first subtree 431 in the first parse tree 430 shares its classification with the second subtree 441 in the second parse tree 440. This determination may be performed by classifying at least the first and second subtrees 431 and 441.

Furthermore, such classifying of subtrees (e.g., first and second subtrees 431 and 441) may be performed based on a set of available classifications stored in a data repository (e.g., database 115, server machine 110, device 150, or device 130). For example, subtree classifier 230 may identify or otherwise determine the classification to be shared by the first and second subtrees 431 and 441 by selecting the classification from the set of available classifications based on an analysis of the first and second subtrees 431 and 441. Such an analysis may be performed by the subtree classifier 230 based on a specification of the coding language that is common to both the first and second documents 410 and 420, a grammar of the coding language, or both. In performing such an analysis, the specification, the grammar, or both, may be accessed from a data repository (e.g., database 115, server machine 110, device 150, or device 130).

In operation 640, with the first and second subtrees 431 and 441 now determined to have a shared classification (e.g., selected from the set of available classifications), the procedure selector 240 selects the first and second subtrees 431 and 441 for comparison to each other. This selection is based on (e.g., responsive to) the determination in operation 630 that the first and second subtrees 431 and 441 have the same classification.

In operation 650, the procedure selector 240 selects a comparison procedure (e.g., comparison procedure 510) to be applied to the selected first and second subtrees 431 and 441, in order to compare them to each other. For example, the procedure selector 240 may choose the comparison procedure 510 from among the group of available comparison procedures 500. The selection of the comparison procedure 510 may be made based on (e.g., in accordance with) the classification that is shared by the first and second subtrees 431 and 441.

According to some example embodiments, a data repository (e.g., database 115, server machine 110, device 150, or device 130) stores definitions, identifiers, or both, for each of the available comparison procedures 500, and the comparison procedure 510 is selected therefrom by the procedure selector 240. For example, such a data repository may store an identifier of the comparison procedure 510 (e.g., a name or a numeric code), a definition of the comparison procedure 510 (e.g., one or more instructions for executing the comparison procedure 510 on input data, such as the first and second subtrees 431 and 441 or the third and fourth subtrees 432 and 442), or both.

In operation 660, the diff generator 250 generates a differential subtree (e.g., differential subtree 551) by inputting the subtrees (e.g., first and second subtrees 431 and 441) that were selected in operation 640 into the comparison procedure (e.g., comparison procedure 510) that was selected in operation 650. For example, the diff generator 250 may perform the comparison procedure 510 on the first and second subtrees 431 and 441 (e.g., by using the first and second subtrees 431 and 441 as inputs to the comparison procedure 510 and executing the comparison procedure 510) to generate the differential subtree 551. As noted above, the generated differential subtree 551 indicates one or more differences (e.g., textual differences) between the compared first and second subtrees 431 and 441.

Figure 7:
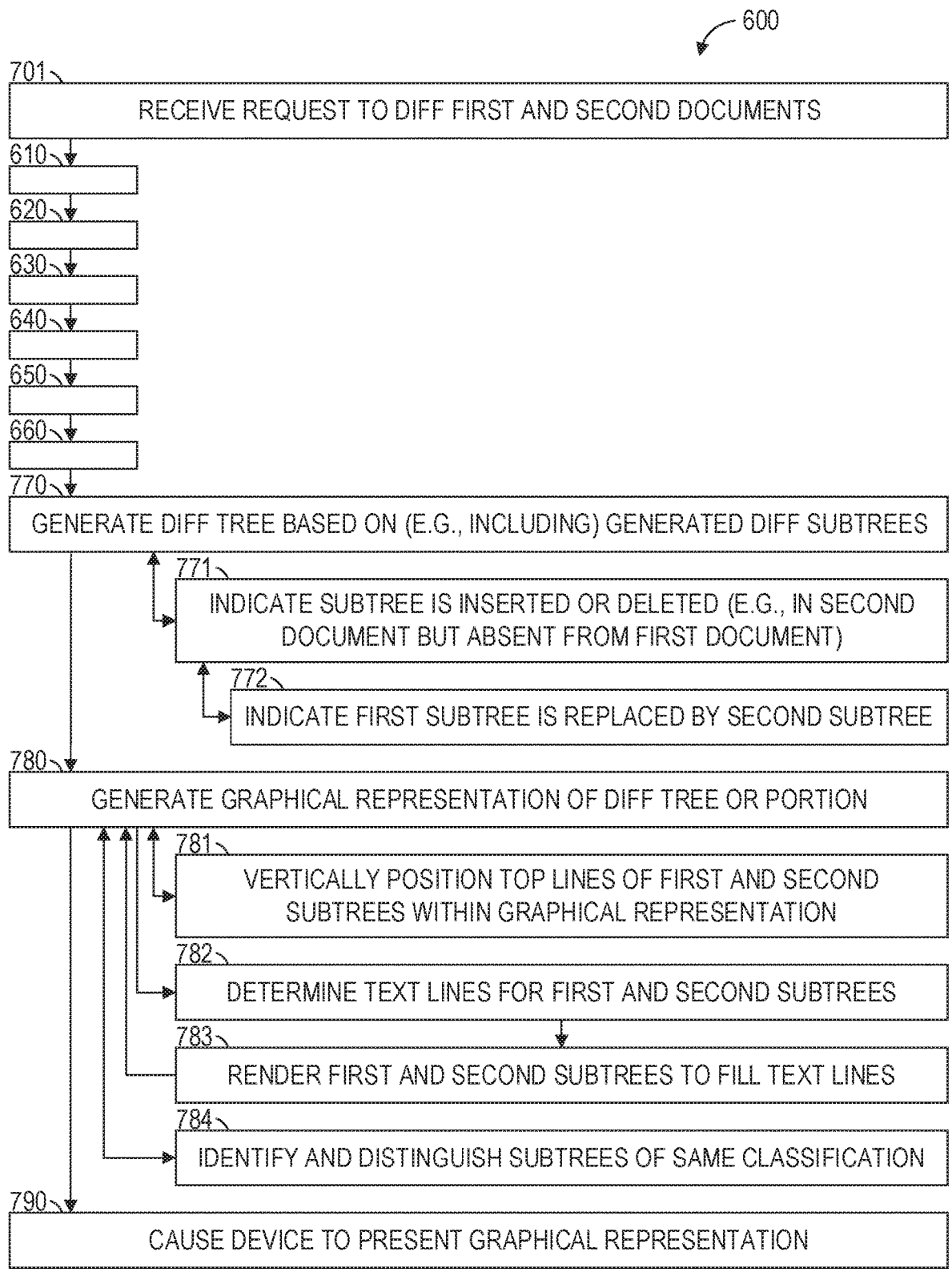

As shown in FIG. 7, in addition to any one or more of the operations previously described, the method 600 may include one or more of operations 701, 770, 771, 772, 780, 781, 782, 783, 784, and 790. Operation 701 may be performed at any point prior to operation 660. In operation 701, the request handler 210 receives a request that any differences (e.g., textual differences) between two documents (e.g., first and second documents 410 and 420) be presented. For example, the request handler 210 may receive such a request from the device 130 (e.g., as submitted by the user 132 of the device 130). According to some example embodiments, the request is received in the form of a command to generate a semantic diff of the first and second documents 410 and 420. In example embodiments where operation 701 is performed, one or more of operations 610-660 may be performed based on operation 701 (e.g., in response to the request, in response to the receiving of the request, or in full or partial fulfillment of the request).

Operation 770 may be performed after operation 660, in which the differential subtree 551 is generated. In operation 770, the diff renderer 260 generates the differential tree 560

(e.g., a diff tree) that indicates one or more differences (e.g., textual differences) between the first and second documents 410 and 420. As noted above, the generated differential tree 560 includes one or more differential subtrees (e.g., differential subtree 551, as generated in operation 660) that were generated by comparing subtrees (e.g., first and second subtrees 431 and 441 or third and fourth subtrees 432 and 442) between the first and second documents 410 and 420. For example, the generated differential subtree 551 may be incorporated into the differential tree 560 (e.g., such that the differential subtree 551 becomes a portion of the differential tree 560).

Operation 771 may be performed as part (e.g., a precursor task, a subroutine, or a portion) of operation 770. In operation 771, as part of generating the differential tree 560, the diff renderer 260 causes the generated differential tree 560 to indicate that a particular subtree (e.g., a fifth subtree, which may be similar to the first subtree 431 or similar to the second subtree 441) is present in one document but not the other (e.g., present in the second document 420 but absent from the first document 410, or vice versa). Accordingly, in situations where the second document 420 is a successor version of the first document 410, the generated differential tree 560 may indicate that this particular subtree has been inserted into the second document 420 (e.g., inserted into the second parse tree 440) or deleted from the first document 410 (e.g., deleted from the first parse tree 430).

Furthermore, for situations in which the first subtree 431 is both deleted and replaced by the second subtree 441, operation 772 may be performed as part of operation 771. In operation 772, as part of generating the differential tree 560, the diff renderer 260 causes the generated differential tree 560 to indicate that the first subtree 431 is replaced by the second subtree 441 in the second document 420 (e.g., replaced by the second subtree 441 within the second parse tree 440).

As also shown in FIG. 7, operation 780 may be performed at any point after operation 660, in which the differential subtree 551 is generated. In operation 780, the diff renderer 260 generates a graphical representation (e.g., an image, a model, a table, a chart, or a document) that depicts at least the differential subtree 551 generated in operation 660. In example embodiments in which the differential tree 560 has been generated, the diff renderer 260 may generate a graphical representation that depicts at least a portion of the generated differential tree 560. In either scenario, the generated graphical representation visually indicates at least one difference (e.g., textual difference) between the first and second subtrees 431 and 441, between the first and second parse trees 430 and 440, between the first and second documents 410 of 420, or any suitable combination thereof. According to some example embodiments, the graphical representation depicts the differential subtree 551 by depicting the first and second subtrees 431 and 441 (e.g., side-by-side) and visually indicating (e.g., highlighting) the at least one difference indicated by the differential subtree 551.

Operation 781 may be performed as part of operation 780, for example, in situations where the first and second subtrees 431 and 441 are or can be represented as lines of text (e.g., each as a separate layout of lines of text that are vertically arranged) within the graphical representation (e.g., within an output image or an output document). In operation 781, as part of generating the graphical representation, the diff renderer 260 vertically positions the top line of the second subtree 441 relative to the top line of the first subtree 431. This vertical positioning may be performed based on the determination (e.g., from operation 630) that the first subtree 431 shares its classification with the second subtree 441.

For example, in some situations, the graphical representation includes an output document (e.g., differential document) with a multi-column (e.g., dual column or triple column) format in which one column presents one or more subtrees (e.g., first subtree 431) from the first document 410 and in which another column presents one or more subtrees (e.g., second subtree 441) from the second document 420. In such situations, the vertical positioning performed in operation 781 may have the effect of visually aligning the tops (e.g., top edges or top boundaries) of the depictions of the first and second subtrees 431 and 441 within the graphical representation (e.g., the output document) to indicate that the first and second subtrees 431 and 441 share a common classification, to indicate that one is a successor version of the other, or both.

Operations 782 and 783 may be performed as part of operation 780, for example, in situations where the first and second subtrees 431 and 441 are or can be represented as arrangements of text with differing vertical lengths (e.g., arrangements that encompass different numbers of text lines) within the graphical representation. In operation 782, the diff renderer 260 determines a number (e.g., a scalar value, such as a count) of text lines to be occupied by depictions of each of the first and second subtrees 431 and 441, within the graphical representation. For example, the first subtree 431 may originally occupy a first number of text lines within the first parse tree 430 or within the first document 410; the second subtree may originally occupy a second number of text lines within the second parse tree 440 or within the second document 420; and the diff renderer 260 may calculate a third number of text lines to be occupied by both the depiction of the first subtree 431 and the depiction of the second subtree 441. The calculation of the third number may be performed by taking the maximum of the first or second numbers. In some example embodiments, the third number is calculated by adding this maximum to the number of text lines that are occupied by (e.g., encompassed by) the generated differential subtree 551.

In operation 783, with the number (e.g., third number, as described with respect to operation 782) of text lines determined, the diff renderer 260 renders depictions of the first and second subtrees 431 and 441 such that they each fill (e.g., span) the determined number of text lines within the graphical representation. Performance of operations 782 and 783 may have the effect of visually aligning the bottoms (e.g., bottom edges are bottom boundaries) of the depictions of the first and second subtrees 431 and 441 within the graphical representation (e.g., an output image or an output document). In combination, performance of operation 781-783 may have the effect of visually aligning both the tops and bottoms of the depictions of the first and second subtrees 431 and 441 in the graphical representation.

Operation 784 may be performed as part of operation 780, in which the diff renderer 260 generates the graphical representation that depicts at least the differential subtree 551. In operation 784, the diff renderer 260 identifies a group of differential subtrees that all share the same classification as the generated differential subtree 551. This may be performed by identifying all compared subtrees (e.g., first and second subtrees 431 and 441) that share the same classification as the first and second subtrees 431 and 441), thereby identifying their corresponding differential subtrees (e.g., similar to differential subtree 551).

As part of operation 784, the diff renderer 260 also visually distinguishes the identified group of differential subtrees within the generated graphical representation. This may be performed by visually distinguishing depictions of their corresponding compared subtrees (e.g., analogous to the first and second subtrees 431 and 441) in the generated graphical representation. For example, the diff renderer 260 may apply a same visual indicator (e.g., a particular color of highlighting or a particular typeface) to the depictions of the first and second subtrees 431 and 441 and to depictions of all other compared subtrees that share the same classification as the first and second subtrees 431 and 441.

According to various example embodiments, operation 784 may be performed multiple times, each time corresponding to a different classification of subtrees. This may have the effect of causing the generated graphical representation to visually distinguish each of the different classifications from each other (e.g., for convenience and ease of understanding by the user 132). That is, the graphical representation may visually distinguish one group of identified differential subtrees (e.g., a group that includes the differential subtree 551) from other groups of identified differential subtrees.

Operation 790 may be performed after operation 780, in which the graphical representation is generated. In operation 790, the request handler 210 causes one or more devices (e.g., device 130) to present the graphical representation generated in operation 780. In situations where performance of operation 701 has resulted in receiving a request that differences between the first and second documents 410 and 420 be presented, operation 790 may be performed in response to (e.g., in fulfillment of) the request. For example, if the request is received from the device 130, the request handler 210 may communicate the graphical representation to the same device 130 and cause the same device 130 to present (e.g., display) the graphical representation. In some example embodiments, the request handler 210 communicates the graphical representation to a different device (e.g., device 150) and causes the different device to present the graphical representation (e.g., in accordance with the request received in operation 701).

Figure 8:
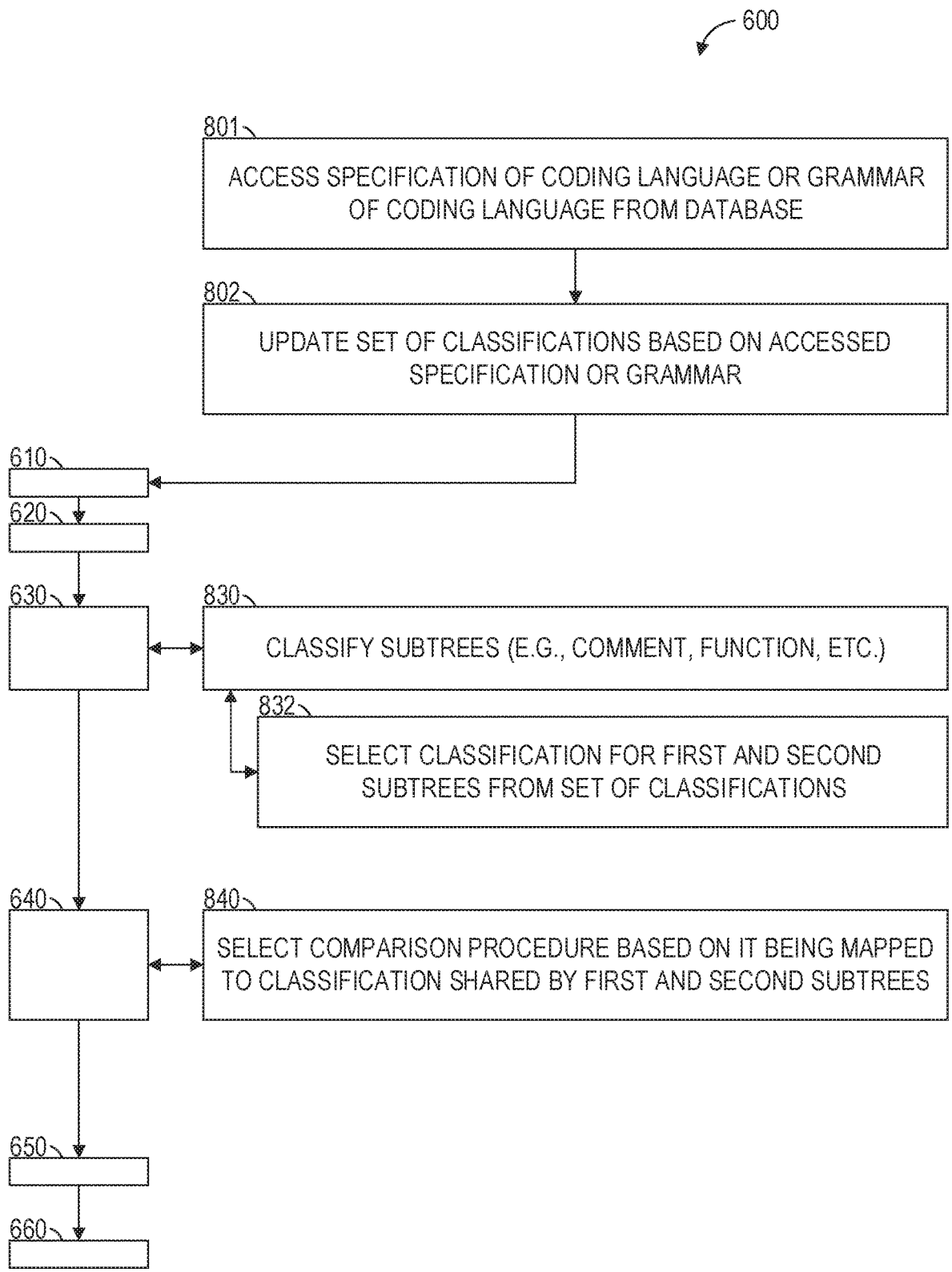

As shown in FIG. 8, in addition to any one or more of the operations previously described, the method 600 may include one or more of operations 801, 802, 830, 832, and 840. One or both of operations 801 and 802 may be performed prior to operation 630, in which it is determined that the first and second subtrees 431 and 441 share the same classification. In operation 801, the subtree classifier 230 accesses a specification of a coding language (e.g., the coding language in which the first and second documents 410 and 420 are at least partially written), a grammar of the coding language, or both. The accessing of the specification or the grammar may be from a data repository (e.g., database 115, server machine 110, device 150, or device 130), and this accessing may be performed in response to detection of an indication that the specification or the grammar has become available or in accordance with regularly (e.g., periodically) scheduled search or retrieval of specifications or grammars of coding languages to be supported by the diff application 200, the server machine 110, the database 115, the device 130, or any suitable combination thereof.

In operation 802, the subtree classifier 230 updates the set of classifications discussed above with respect to operation 630, and the updating of the set of classifications is based on the information (e.g., the specification, the grammar, or both) accessed in operation 801. Performance of operations 801 and 802 may result in expanding the capabilities of the diff application 200, the server machine 110, the database 115, the device 130, or any suitable combination thereof, by adding support for the coding language that corresponds to the specification or grammar accessed in operation 801.

Operation 830 may be performed as part (e.g., a precursor task, a subroutine, or a portion) of operation 630, in which the subtree classifier 230 determines that the first and second subtrees 431 and 441 share the same classification. In operation 830, the subtree classifier 230 classifies (e.g., iteratively) the subtrees (e.g., first, second, third, and fourth subtrees 431, 432, 441, and 442) found in the first and second parse trees 430 and 440 that were respectively derived from the first and second documents 410 of 420. By performance of operation 830, some or all of the subtrees present in the first and second parse trees 430 and 440 become classified, and the classification of the subtrees may be based on a set of available classifications. The set of available classifications may be stored by a data repository (e.g., database 115, server machine 110, device 150, or device 130) and accessed therefrom by the subtree classifier 230.

The set of available classifications may include one or more of the following example classifications: comment, function, function call, method, method call, array, class, software module, variable, datatype, constructor, list comprehension, import statement, relational operator, arithmetic operator, Boolean operator, bitwise operation, member access operator, subscript, scope resolution statement, integer value, float value, character string, interpolation element, text element, null, symbol, hash, key value, tuple, set, paragraph, section, heading, unordered list, ordered list, block quote, thematic break, block, strong text, emphasis text, plain text, link, image, code, line break, conditional statement, match statement, pattern match expression, assignment statement, return statement, yield statement, break statement, continue statement, no-op statement, for loop, for each loop, while loop, do while loop, throw statement, try statement, catch statement, finally block, annotation, and product. As noted above, additional classifications can be added to the set of classifications by performance of operations 801 and 802.

Operation 832 may be performed as part of operation 830, in which the subtree classifier 230 classifies subtrees within the first and second parse trees 430 and 440. In operation 832, the subtree classifier 230 classifies the first subtree 431 by selecting its corresponding classification from the set of available classifications, and the subtree classifier 230 classifies (e.g., separately) the second subtree 441 by selecting its classification from the set of available classifications. In example embodiments where operations 801 and 802 were previously performed to update the set of classifications, the subtree classifier 230 performs operation 832 by selecting the classification for the first and second subtrees 431 and 441 from the updated set of classifications (e.g., as updated by performance of operation 802). In situations where the classification of the first subtree 431 matches the classification of the second subtree 441, the subtree classifier 230 determines that the first and second subtrees 431 and 441 both have the same shared classification, as discussed above with respect to operation 630.

Operation 840 may be performed as part of operation 640, in which the procedure selector 240 selects the comparison procedure 510 that will be used to compare the first and second subtrees 431 and 441. As noted above, in operation 640, the procedure selector 240 selects the comparison procedure 510 based on (e.g., influenced at least in part by) the classification that is shared by the first and second subtrees 431 and 441, and the comparison procedure 510 may be selected from among the group of available comparison procedures 500.

However, according to some example embodiments, each classification within at least a special portion of the set of available classifications may be specifically mapped to (e.g., assigned to, linked to, or otherwise explicitly associated with) a corresponding comparison procedure (e.g., among the available comparison procedures 500). These mappings of one or more classifications to one or more comparison procedures may be defined, stored, updated, or otherwise maintained by a data structure (e.g., hardcoded into the diff application 200, stored by the database 115, stored by the server machine 110, or stored by the device 130). In some implementations, each classification within the special portion is uniquely mapped to its own separate corresponding comparison procedure. In other implementations, multiple classifications in the special portion may be mapped to the same corresponding comparison procedure. In either case, a specific mapping between the comparison procedure 510 and the shared classification for the first and second subtrees 431 and 441 can form a basis (e.g., a trigger) for selecting that comparison procedure 510 for use in comparing the first and second subtrees 431 and 441.

For example, according to certain example embodiments, the classifications that are mapped to a specific corresponding comparison procedure (e.g., among the available comparison procedures 500) include: comment, function, function call, method, method call, array, class, and software module. Thus, if the shared classification for the first and second subtrees 431 and 441 is one of these classifications (e.g., a comment), then the comparison procedure that is specifically mapped to their classification (e.g., comparison procedure 500) is selected in operation 840.

Figure 9:
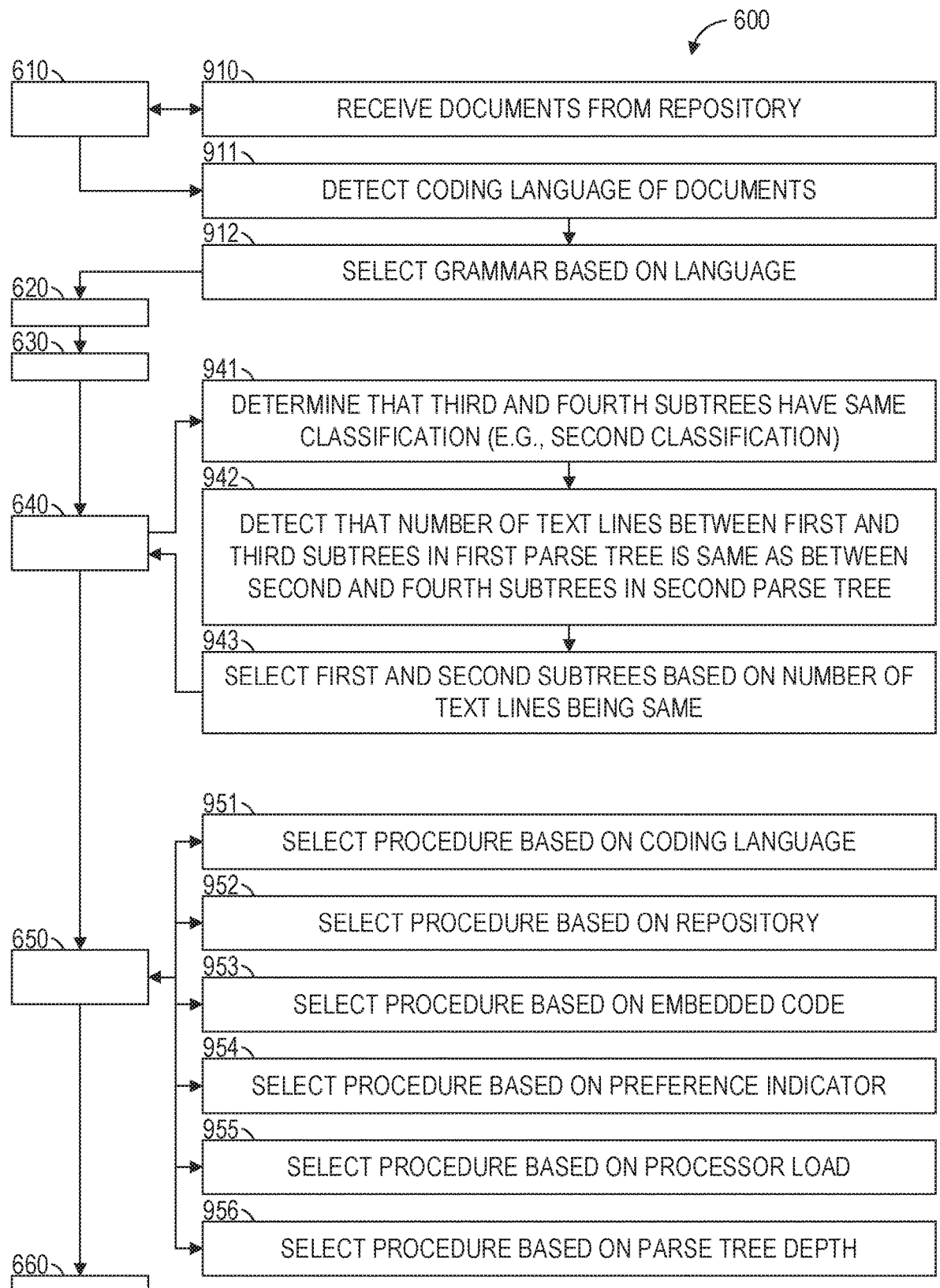

As shown in FIG. 9, in addition to any one or more of the operations previously described, the method 600 may include one or more of operations 910, 911, 912, 941, 942, 943, 951, 952, 953, 954, 955, and 956. Operation 910 may be performed as part (e.g., a precursor task a subroutine, or a portion) of operation 610, in which the request handler 210 accesses the first and second documents 410 and 420 to be compared. In operation 910, the request handler 210 accesses the first and second documents 410 and 420 by receiving the first and second documents 410 and 420 from a particular data repository (e.g., database 115, server machine 110, device 130, device 150, or some other suitable data source communicatively coupled to the network 190). This particular data repository may correspond to one or more of the available comparison procedures 500. For example, the data repository may be mapped to the comparison procedure 510 (e.g., as defined or otherwise maintained by a data structure, such as the diff application 200 or the database 115). As described below with respect to operation 952, the particular data repository from which the first and second documents 410 and 420 are accessed may form a basis (e.g., influenced) for performing operation 650, in which the comparison procedure (e.g., comparison procedure 510) is selected for comparing the first and second subtrees 431 and 441.

Operations 911 and 912 may be performed between operation 610 and 620. In operation 911, the document parser 220 detects the coding language in which the first and second documents 410 and 420 are written. This may be performed by analyzing the first and second documents 410 and 420. In some example embodiments, the coding language is a programming language, and operation 911 is performed by detecting (e.g., by analyzing the first and second documents 410 and 420) the programming language in which the first and second documents 410 and 420 are written.

In operation 912, the document parser 220 selects the grammar discussed above with respect to operation 620, and the selection of the grammar is based on the coding language detected in operation 911. In example embodiments where the coding language is a programming language, the document parser 220 selects the grammar of the programming language based on the detected programming language. For example, a data repository (e.g., database 115, server machine 110, device 150, or device 130) may store a set of grammars for various coding languages (e.g., programming languages), and the document parser 220 may select the grammar therefrom, based on the detected coding language for the first and second documents 410 and 420. This may have the effect of choosing an appropriate grammar for performance of operation 620, in which the first and second parse trees 430 and 440 are generated. Accordingly, after performance of operation 660, the one or more differences (e.g., textual differences) indicated by the generated differential subtree 551 may accurately indicate a syntactic difference between the first and second subtrees 431 and 441.

One or more of operations 941, 942, and 943 may be performed as part of operation 640, in which the procedure selector 240 selects the first and second subtrees 431 and 441 for comparison to each other. According to various example embodiments, additional pairs of subtrees included in the first and second parts trees 430 and 140 may be determined to share a same classification. Thus, in operation 941, the procedure selector 240 determines that the third and fourth subtrees 432 and 442 have the same classification shared in common (e.g., second classification).

In operation 942, the procedure selector 240 detects that the first subtree 431 precedes the third subtree 432 (e.g., within a vertical arrangement of the first parse tree 430) by a same number of text lines by which the second subtree 441 precedes the fourth subtree 442 (e.g., within a vertical arrangement of the second parse tree 440). This may be performed by measuring a first vertical distance (e.g., counted in text lines) between the top text line of the first subtree 431 and the top text line of the third subtree 432 in the first parse tree 430, measuring a second vertical distance (e.g., also counted in text lines) between the top text line of the second subtree 441 and the top text line of the fourth subtree 442, and then detecting that the first vertical distance matches the second vertical distance.

In operation 443, the procedure selector 240 chooses the first and second subtrees 431 and 441 for comparison to each other (e.g., in accordance with a comparison procedure to be chosen later, such as in operation 650) based on the detection performed in operation 942. For example, the procedure selector 240 may choose the first and second subtrees 431 and 441 for comparison to each other based on the first vertical distance being the same as a second vertical distance, as discussed above with respect operation 942. Accordingly, the selecting of the first and second subtrees 431 and 441 may be based on the third and fourth subtrees 432 and 442 sharing their common classification (e.g., second classification) and respectively preceding the first and second subtrees 431 and 441 by the same number of text lines.

One or more of operations 951, 952, 953, 954, 955, and 956 may be performed as part of operation 650, in which the procedure selector 240 selects the comparison procedure 510 based on the classification shared by the first and second subtrees 431 and 441. According to various example embodiments, this selection is further based on (e.g., influenced by) one or more additional factors.

In operation 951, the procedure selector 240 selects the comparison procedure 510 based on the coding language (e.g., programming language) in which the first and second documents 410 and 420 are written (e.g., fully or partially written). In some example embodiments, the coding language was previously identified or otherwise detected during performance of operation 911, and an identifier of the coding language may accordingly form a basis for performing operation 951.

In operation 952, the procedure selector selects the comparison procedure 510 based on the data repository from which the first and second documents 410 and 420 were received (e.g., in operation 910). In certain example embodiments, the data repository was previously identified or otherwise detected by the request handler 210 during performance of operation 910, and an identifier of the data repository may accordingly form a basis for performing operation 952. According to certain example embodiments, the first and second documents 410 and 420 each include some respective portions that are written in a first coding language (e.g., a first programming language), as well as other respective portions that are written in a second coding language (e.g., second programming language). For example, the first and second documents 410 and 420 may each be written in a primary coding language (e.g., a primary programming language) but also contain some embedded text (e.g., embedded software code) written in a secondary coding language (e.g., a secondary programming language). In such example embodiments, operation 953 may be performed to select the comparison procedure 510 based on the coding language of the embedded text.

For example, the first subtree 431 may include first embedded code that is written in a particular coding language (e.g., second coding language) that is different from the primary coding language of the document 410, and the second subtree 441 may include second embedded code that is written in the same particular coding language (e.g., the second coding language), which is different from the primary coding language of the document 420. Accordingly, in operation 953, the procedure selector 240 selects the comparison procedure 510 based on that particular coding language (e.g., the second coding language). As noted above, the coding language used in each of the first and second documents 410 and 420 may have been previously identified or otherwise detected during performance of operation 911. Thus, an identifier of the particular coding language in which the first and second embedded code is written may form a basis for performing operation 953.

According to some example embodiments, one or more user preferences set by the user 132 of the device 130 are used as a basis for selection of the comparison procedure 510. Thus, in operation 954, the procedure selector 240 may access a user profile of the user 132 and use the user profile as a basis for selecting the comparison procedure 510. For example, the user 132 may cause the device 130 to store a user profile that includes one or more user preferences that have previously been set by the user 132, and such one or more user preferences may specify that the user 132 prefers that certain classifications of subtrees (e.g., comments, functions, and function calls) be bases (e.g., influences or triggers) for selecting a predetermined (e.g., user-selected) comparison procedure (e.g., comparison procedure 510) from the group of available comparison procedures 500. Such a user profile may be stored in the data repository (e.g., database 115, server machine 110, the device 150, or device 130) and accessed therefrom by the procedure selector 240 in performing operation 954. This may have the effect of providing convenience and customizability for the user 132

According to various example embodiments, the selection of the comparison procedure in operation 650 is influenced by how much computational load is being experienced by the machine that is performing operation 650 (e.g., the server machine 110 or the device 130). Thus, in operation 955, the procedure selector 240 may detect the computational load currently being experienced by the machine (e.g., by one or more processors of the machine) and use the detected computational load as a basis for selecting the comparison procedure 510 from among the group of available comparison procedures 500. For example, during high computational loading (e.g., meeting or exceeding a threshold maximum load), the procedure selector 240 may choose a comparison procedure (e.g., comparison procedure 510) that would place a relatively low additional computational load on the machine. As another example, during low computational loading (e.g., meeting or falling below a threshold minimum load), the procedure selector 240 may choose a comparison procedure (e.g., comparison procedure 510) that would place a relatively high additional computational load on the machine. This may have the effect of dynamically tuning the performance of the diff application 200 in response to changing processor loading conditions.

According to certain example embodiments, each of the first and second parse trees 430 and 440 is organized into multiple layers, and some comparison procedures (e.g., comparison procedure 510) in the group of available comparison procedures 500 are better suited for certain layers (e.g., high layers, such as those within a predetermined threshold number of layers from the root of each parse tree) than other layers (e.g., low layers, such as those beyond a predetermined threshold number of layers from the root of each parse tree). That is, the parse tree depth at which the first and second subtrees 431 and 441 occur within the first and second parse trees 430 and 440 may be used by the procedure selector 240 as a basis for selecting the comparison procedure 510. Thus, in operation 956, the procedure selector 240 may detect at which layer the first subtree 431 lies within the first parse tree 430 and then select the comparison procedure 510 based on the detected layer of the first subtree 431. Alternatively, the procedure selector 240 may detect at which layer the second subtree 441 lies within the second parse tree 440 and then select the comparison procedure 510 based on the detected layer of the second subtree 441. This may have the effect of providing layer-sensitivity (e.g., sensitivity to parse tree depth) to the diff application 200.

According to various example embodiments, one or more of the methodologies described herein may facilitate generating a differential subtree (e.g., differential subtree 551) that indicates semantic differences between corresponding subtrees (e.g., first and second subtrees 431 and 441) within two documents (e.g., first and second documents 410 and 420). Moreover, one or more of the methodologies described herein may facilitate generation and presentation of a differential tree (e.g., differential tree 560) that indicates various semantic differences between the two documents. Hence, one or more of the methodologies described herein may facilitate generation and presentation of a semantic diff (e.g., a differential report, in the form of an image or document), as well as accurate and convenient visual indication of semantic differences between such documents, compared to capabilities of pre-existing systems and methods.

When these effects are considered in aggregate, one or more of the methodologies described herein may obviate a need for certain efforts or resources that otherwise would be involved in generation or presentation of a semantic diff, generation or presentation of a differential subtree, generation or presentation of a differential tree, or any suitable combination thereof. Efforts expended by a user in generating or presenting a semantic diff, a differential subtree, a differential tree, or any suitable combination thereof, may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 10:
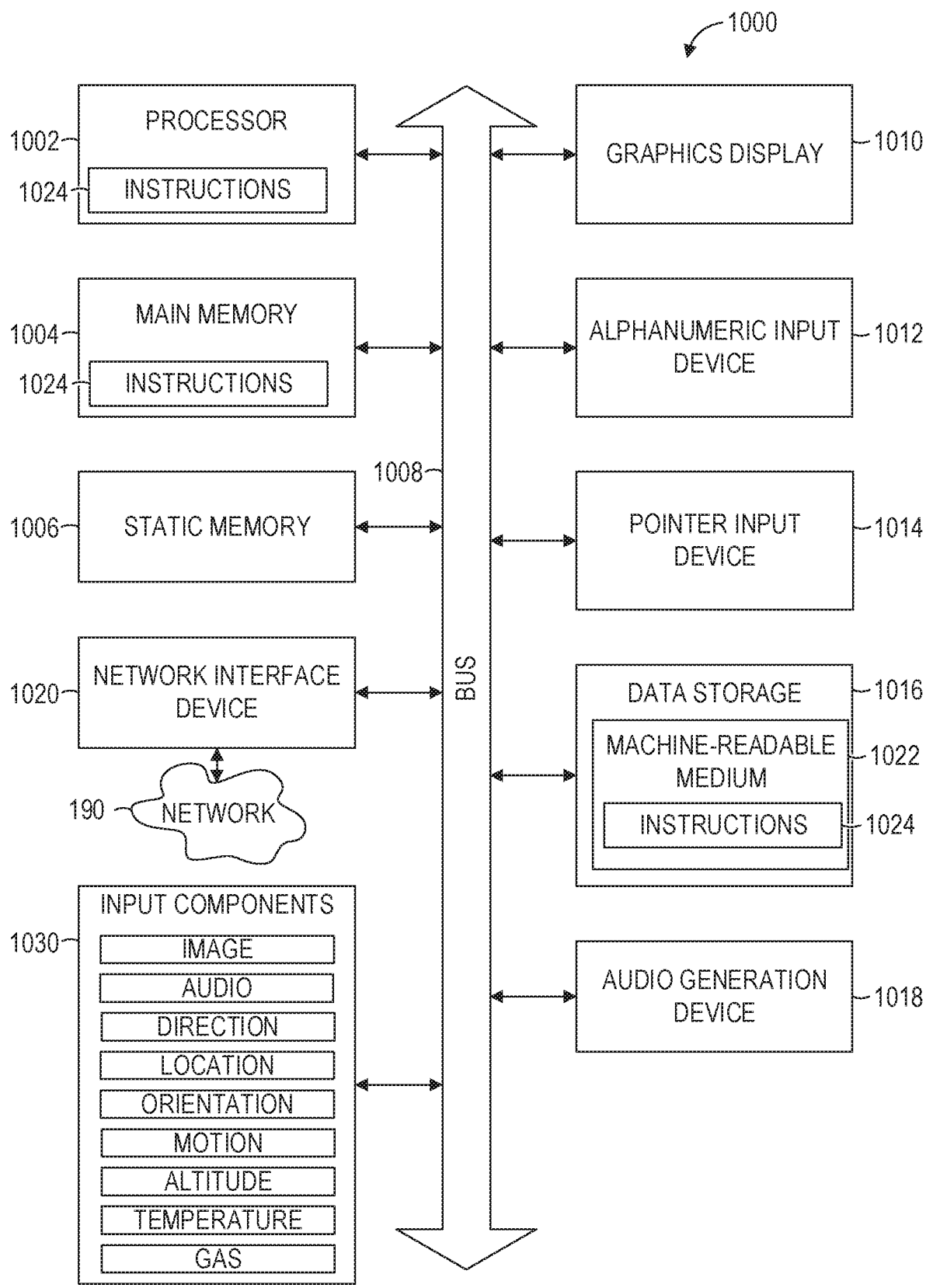
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device (e.g., a smart phone, a tablet computer, or a wearable device), and may have one or more additional input components 1030 (e.g., sensors or gauges). Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1024 for execution by the machine 1000 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals." or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, by one or more processors, first and second text documents both written in a coding language that is common to both;
generating, by the one or more processors, first and second parse trees by parsing the accessed first and second text documents based on a grammar of the coding language common to the first and second text documents, the first parse tree including a first plurality of subtrees, the second parse tree including a second plurality of subtrees;
determining, by the one or more processors, that a first subtree in the first plurality shares a classification with a second subtree in the second plurality by classifying the first and second subtrees based on a set of classifications that includes the shared classification;
selecting, by the one or more processors, the first and second subtrees for comparison to each other based on the determining that the first subtree shares the classification with the second subtree;
selecting, by the one or more processors, a comparison procedure applicable to the first and second subtrees based on the classification shared by the first and second subtrees, the comparison procedure being selected from a plurality of available comparison procedures; and
generating, by the one or more processors, a differential subtree by performing the selected comparison procedure on the first and second subtrees, the generated differential subtree indicating a textual difference between the first and second subtrees.

A second embodiment provides a method according to the first embodiment, further comprising:
generating a differential tree that indicates textual differences between the first and second text documents, the generated differential tree including the generated differential subtree that indicates the textual difference between the first and second subtrees.

A third embodiment provides a method according to the second embodiment, wherein:
the generated differential tree that indicates textual differences between the first and second text documents further indicates that a third subtree is present in the second text document but absent from the first text document.

A fourth embodiment provides a method according to the second embodiment or the third embodiment, further comprising:
generating a graphical representation of at least a portion of the generated differential tree, the generated graphical representation visually indicating the textual difference between the first and second subtrees.

A fifth embodiment provides a method according to any of the second through fourth embodiments, further comprising:
identifying differential subtrees within the generated differential tree, the identified differential subtrees sharing the classification that is shared by the first and second subtrees; and wherein
the generated graphical representation visually distinguishes the identified differential subtrees from other differential subtrees within the generated differential tree.

A sixth embodiment provides a method according to the fourth embodiment, wherein:
the generating of the graphical representation includes vertically positioning a top line of the second subtree relative to a top line of the first subtree based on the determining that the first subtree shares the classification with the second subtree.

A seventh embodiment provides a method according to the fourth embodiment or the fifth embodiment, wherein:
the generating of the graphical representation includes:
determining a number of text lines to be occupied by each of the first and second subtrees in the graphical representation; and
rendering the first and second subtrees to each fill the determined number of text lines in the graphical representation.

An eighth embodiment provides a method according to any of the fourth through sixth embodiments, further comprising:
receiving a request that textual differences between the first and second text documents be presented, the request being received from a device, the accessing of the first and second text documents being in response to the receiving of the request; and
causing the device to present the generated graphical representation of at least the portion of the generated differential tree in response to the request received from the device.

A ninth embodiment provides a method according to any of the first through eighth embodiments, wherein:
the classifying of the first and second subtrees includes selecting the shared classification from a group consisting of: comment, function, function call, method, method call, array, class, software module, variable, datatype, constructor, list comprehension, import statement, relational operator, arithmetic operator, Boolean operator, bitwise operation, member access operator, subscript, scope resolution statement, integer value, float value, character string, interpolation element, text element, null, symbol, hash, key value, tuple, set, paragraph, section, heading, unordered list, ordered list, block quote, thematic break, block, strong text, emphasis text, plain text, link, image, code, line break, conditional statement, match statement, pattern match expression, assignment statement, return statement, yield statement, break statement, continue statement, no-op statement, for loop, for each loop, while loop, do while loop, throw statement, try statement, catch statement, finally block, annotation, and product.

A tenth embodiment provides a method according to any of the first through ninth embodiments, further comprising:
accessing at least one of a specification of the coding language or a grammar of the coding language from a database;
updating the set of classifications based on at least one of the specification of the coding language or the grammar of the coding language; and wherein
the classifying of the first and second subtrees includes selecting the shared classification from the updated set of classifications.

An eleventh embodiment provides a method according to any of the first through tenth embodiments, wherein:
the classifying of the first and second subtrees includes selecting the shared classification from a group consisting of: comment, function, function call, method, method call, array, class, and software module; and the selecting of the comparison procedure from the plurality of available comparison procedures is based on the comparison procedure being mapped to the shared classification by a data structure.

A twelfth embodiment provides a method according to any of the first through eleventh embodiments, wherein:
the selecting of the comparison procedure applicable to the first and second subtrees is further based on the coding language in which both the first and second text documents are written.

A thirteenth embodiment provides a method according to any of the first through twelfth embodiments, wherein:
the accessing of the first and second text documents includes receiving both the first and second text documents from a data repository; and
the selecting of the comparison procedure applicable to the first and second subtrees is further based on the data repository from which both the first and second text documents are received.

A fourteenth embodiment provides a method according to any of the first through thirteenth embodiments, wherein:
the first and second text documents both include portions written in a first coding language and other portions written in a second coding language;
the first subtree includes first embedded code written in the second coding language, and the second subtree includes second embedded code written in the second coding language; and
the selecting of the comparison procedure applicable to the first and second subtrees is further based on the second coding language of the first and second embedded code.

A fifteenth embodiment provides a method according to any of the first through fourteenth embodiments, wherein:
the selecting of the comparison procedure applicable to the first and second subtrees is further based on a preference indicator stored in a user profile.

A sixteenth embodiment provides a method according to any of the first through fifteenth embodiments, wherein:
the selecting of the comparison procedure applicable to the first and second subtrees is further based on a detected computational load on the one or more processors.

A seventeenth embodiment provides a method according to any of the first through sixteenth embodiments, wherein:
the selecting of the comparison procedure applicable to the first and second subtrees is further based on a detected layer at which the first subtree is located within the first parse tree.

An eighteenth embodiment provides a method according to any of the first through seventeenth embodiments, wherein:
the generated differential subtree that indicates the textual difference between the first and second subtrees further indicates that the first subtree is replaced by the second subtree in the second text document.

A nineteenth embodiment provides a method according to any of the first through eighteenth embodiments, wherein:
the classification shared by the first and second subtrees is a first classification in the set of classifications; and
the method further comprises:
determining that a third subtree in the first plurality of subtrees shares a second classification with a fourth subtree in the second plurality of subtrees, the second classification being included in the set of classifications.

A twentieth embodiment provides a method according to the nineteenth embodiment, further comprising:

detecting that the first subtree precedes the third subtree in the first parse tree by a same number of text lines by which the second subtree precedes the fourth subtree in the second parse tree; and wherein:

the selecting of the first and second subtrees for comparison to each other is further based on the third and fourth subtrees sharing the second classification while respectively preceding the first and second subtrees by the same number of text lines.

A twenty-first embodiment provides a method according to any of the first through twentieth embodiments, wherein:
the coding language in which the first and second text documents are written is a programming language; and
the method further comprises:
detecting the programming language in which both the first and second text documents are written; and
selecting the grammar of the programming language based on the detecting of the programming language; and wherein the textual difference indicated by the generated differential subtree indicates a syntactic difference between the first and second subtrees.

A twenty-second embodiment provides a machine-readable medium (e.g., a non-transitory machine-readable storage medium) comprising instructions that, when executed by one or more processors of a machine, cause the machine to perform operations comprising:
accessing first and second text documents both written in a coding language that is common to both;
generating first and second parse trees by parsing the accessed first and second text documents based on a grammar of the coding language common to the first and second text documents, the first parse tree including a first plurality of subtrees, the second parse tree including a second plurality of subtrees;
determining that a first subtree in the first plurality shares a classification with a second subtree in the second plurality by classifying the first and second subtrees based on a set of classifications that includes the shared classification;
selecting the first and second subtrees for comparison to each other based on the determining that the first subtree shares the classification with the second subtree;
selecting a comparison procedure applicable to the first and second subtrees based on the classification shared by the first and second subtrees, the comparison procedure being selected from a plurality of available comparison procedures; and
generating a differential subtree by performing the selected comparison procedure on the first and second subtrees, the generated differential subtree indicating a textual difference between the first and second subtrees.

A twenty-third embodiment provides a machine-readable medium according to the twenty-second embodiment, wherein:
the first and second text documents are first and second text files; and the operations further comprise:
generating a differential tree that indicates textual differences between the first and second text files, the generated differential tree including the generated differential subtree that indicates the textual difference between the first and second subtrees.

A twenty-fourth embodiment provides a system (e.g., a computer system configured by the diff application 200) comprising:
one or more processors; and
a memory storing instructions that, when executed by at least one processor among the one or more processors, cause the system to perform operations comprising:
accessing first and second text documents both written in a coding language that is common to both;
generating first and second parse trees by parsing the accessed first and second text documents based on a grammar of the coding language common to the first and second text documents, the first parse tree including a first plurality of subtrees, the second parse tree including a second plurality of subtrees;
determining that a first subtree in the first plurality shares a classification with a second subtree in the second plurality by classifying the first and second subtrees based on a set of classifications that includes the shared classification;
selecting the first and second subtrees for comparison to each other based on the determining that the first subtree shares the classification with the second subtree;
selecting a comparison procedure applicable to the first and second subtrees based on the classification shared by the first and second subtrees, the comparison procedure being selected from a plurality of available comparison procedures; and
generating a differential subtree by performing the selected comparison procedure on the first and second subtrees, the generated differential subtree indicating a textual difference between the first and second subtrees.

A twenty-fifth embodiment provides a system according to the twenty-fourth embodiment, wherein the operations further comprise:
generating a differential tree that indicates textual differences between the first and second text documents, the generated differential tree including the generated differential subtree that indicates the textual difference between the first and second subtrees; and
generating a graphical representation of at least a portion of the generated differential tree, the generated graphical representation visually indicating the textual difference between the first and second subtrees.

A twenty-sixth embodiment provides a carrier medium carrying machine-readable instructions for controlling a machine to carry out the method of any of the first through twenty-first embodiments.

What is claimed is:
1. A method comprising:
accessing, by one or more processors, a first text document and a second text document both written in a coding language that is common to both;
determining the coding language is one of a plurality of programming languages, wherein each of the plurality of programming languages uniquely corresponds to at least one of a language specific specification or a language specific or grammar stored in a storage device that is accessible by the one or more processors;
accessing the at least one of the specification or the grammar corresponding to the determined coding language, by the one or more processors;
based on the accessed at least one of the specification or the grammar:
generating, by the one or more processors, a first parse tree and a second parse tree by parsing the accessed first text document and the second text document, respectively, based on a grammar of the coding language common to the first text document and the second text document, the first parse tree including a first plurality of subtrees, the second parse tree including a second plurality of subtrees; and
determining, by the one or more processors, that a first subtree in the first plurality of subtrees shares a classification with a second subtree in the second plurality of subtrees by classifying the first subtree and the second subtree based on a set of classifications that includes the shared classification;

selecting, by the one or more processors, the first subtree and the second subtree for comparison to each other based on the determining that the first subtree shares the classification with the second subtree;

mapping each one of the set of classifications to one of a plurality of available comparison procedures that is applicable to the corresponding classification;

selecting, by the one or more processors, a comparison procedure from the plurality of available comparison procedures applicable to the first subtree and the second subtree based on the classification shared by the first subtree and the second subtree; and generating, by the one or more processors, a differential subtree by performing the selected comparison procedure on the first subtree and the second subtree, the generated differential subtree indicating a textual difference between the first subtree and the second subtree.

2. The method of claim 1, further comprising:
generating a differential tree that indicates textual differences between the first text document and the second text document, the generated differential tree including the generated differential subtree that indicates the textual difference between the first subtree and the second subtree.

3. The method of claim 2, wherein:
the generated differential tree that indicates textual differences between the first text document and the second text document further indicates that a third subtree is present in the second text document but absent from the first text document.

4. The method of claim 2, further comprising:
generating a graphical representation of at least a portion of the generated differential tree, the generated graphical representation visually indicating the textual difference between the first subtree and the second subtree.

5. The method of claim 4, further comprising:
identifying differential subtrees within the generated differential tree, the identified differential subtrees sharing the classification that is shared by the first subtree and the second subtree; and wherein the generated graphical representation visually distinguishes the identified differential subtrees from other differential subtrees within the generated differential tree.

6. The method of claim 4, wherein:
the generating of the graphical representation includes vertically positioning a top line of the second subtree relative to a top line of the first subtree based on the determining that the first subtree shares the classification with the second subtree.

7. The method of claim 4, wherein:
the generating of the graphical representation includes:
determining a number of text lines to be occupied by each of the first subtree and the second subtree in the graphical representation; and
rendering the first subtree and the second subtree to each fill the determined number of text lines in the graphical representation.

8. The method of claim 4, further comprising:
receiving a request to present textual differences between the first text document and the second text document, the request being received from a device, the accessing of the first text document and the second text document being in response to the receiving of the request; and
causing the device to present the generated graphical representation of at least the portion of the generated differential tree in response to the request received from the device.

9. The method of claim 1, wherein:
the set of classifications includes at least one of the following: comment, function, function call, method, method call, array, class, software module, variable, datatype, constructor, list comprehension, import statement, relational operator, arithmetic operator, Boolean operator, bitwise operation, member access operator, subscript, scope resolution statement, integer value, float value, character string, interpolation element, text element, null, symbol, hash, key value, tuple, set, paragraph, section, heading, unordered list, ordered list, block quote, thematic break, block, strong text, emphasis text, plain text, link, image, code, line break, conditional statement, match statement, pattern match expression, assignment statement, return statement, yield statement, break statement, continue statement, no-op statement, for loop, for each loop, while loop, do while loop, throw statement, try statement, catch statement, finally block, annotation, or product.

10. The method of claim 1, further comprising:
accessing at least one of a specification corresponding to the coding language or a grammar corresponding to the coding language from a database;
updating the set of classifications based on at least one of the specification corresponding to the coding language or the grammar corresponding to the coding language; and wherein
the determining the shared classification includes selecting the shared classification from the updated set of classifications.

11. The method of claim 1, wherein:
the determining the shared classification includes selecting the shared classification from a group consisting of: comment, function, function call, method, method call, array, class, and software module; and
the selecting of the comparison procedure from the plurality of available comparison procedures is based on the comparison procedure being mapped to the shared classification by a data structure.

12. The method of claim 1, wherein:
the selecting of the comparison procedure applicable to the first subtree and the second subtree is further based on the coding language in which both the first text document and the second text document are written.

13. The method of claim 1, wherein:
the accessing of the first text document and the second text document includes receiving both the first text document and the second text document from a data repository; and
the selecting of the comparison procedure applicable to the first subtree and the second subtree is further based on the data repository from which both the first text document and the second text document are received.

14. The method of claim 1, wherein:
the first text document and second text document each includes portions written in a first coding language and other portions written in a second coding language;
the first subtree includes first embedded code written in the second coding language, and the second subtree includes second embedded code written in the second coding language; and the selecting of the comparison procedure applicable to the first subtree and the second subtree is further based on the second coding language of the first embedded code and the second embedded code.

15. The method of claim 1, wherein:
the selecting of the comparison procedure applicable to the first subtree and the second subtree is further based on a preference indicator stored in a user profile.

16. The method of claim 1, wherein:
the selecting of the comparison procedure applicable to the first subtree and the second subtree is further based on a detected computational load on the one or more processors.

17. The method of claim 1, wherein:
the selecting of the comparison procedure applicable to the first subtree and the second subtree is further based on a detected layer at which the first subtree is located within the first parse tree.

18. The method of claim 1, wherein:
the generated differential subtree that indicates the textual difference between the first subtree and the second subtree further indicates that the first subtree is replaced by the second subtree in the second text document.

19. The method of claim 1, wherein:
the classification shared by the first subtree and the second subtree is a first classification in the set of classifications; and
the method further comprises:
determining that a third subtree in the first plurality of subtrees shares a second classification with a fourth subtree in the second plurality of subtrees, the second classification being included in the set of classifications.

20. The method of claim 19, further comprising:
detecting that the first subtree precedes the third subtree in the first parse tree by a same number of text lines by which the second subtree precedes the fourth subtree in the second parse tree; and wherein:
the selecting of the first subtree and the second subtree for comparison to each other is further based on the third subtree and fourth subtree sharing the second classification while respectively preceding the first subtree and the second subtree by the same number of text lines.

21. The method of claim 1, wherein:
the coding language in which the first text document and the second text document are written is a programming language; and
the method further comprises:
detecting the programming language in which both the first text document and second text document are written; and
selecting the grammar corresponding to the detected programming language; and
wherein
the textual difference indicated by the generated differential subtree indicates a syntactic difference between the first subtree and the second subtree.

22. A computer program product comprising one or more hardware storage devices having stored thereon computer-executable instructions that are executable by one or more processors of a machine, cause the machine to perform operations comprising:
accessing a first text document and a second text document both written in a coding language that is common to both;
determining the coding language is one of a plurality of programming languages, wherein each of the plurality of coding languages uniquely corresponds to at least one of a language specific specification or a language specific grammar stored in a storage device that is accessible by the one or more processors;
accessing the at least one of the specification or the grammar corresponding to the determined coding language, by the one or more processors;
based on the accessed at least one of the specification or the grammar:
generating a first parse tree and a second parse tree by parsing the accessed first text document and the second text document, respectively, based on a grammar of the coding language common to the first text document and the second text document, the first parse tree including a first plurality of subtrees, the second parse tree including a second plurality of subtrees; and
determining that a first subtree in the first plurality of subtrees shares a classification with a second subtree in the second plurality of subtrees by classifying the first subtree and the second subtree based on a set of classifications that includes the shared classification;
selecting the first subtree and the second subtree for comparison to each other based on the determining that the first subtree shares the classification with the second subtree;
mapping each one of the set of classification to one of a plurality of available comparison procedures that is applicable to the corresponding classification;
selecting a comparison procedure from the plurality of available comparison procedures applicable to the first subtree and the second subtree based on the classification shared by the first subtree and the second subtree; and
generating a differential subtree by performing the selected comparison procedure on the first subtree and the second subtree, the generated differential subtree indicating a textual difference between the first subtree and the second subtree.

23. The computer program product of claim 22, wherein:
the first text document and the second text document are a first text file and a second text file, respectively; and
the operations further comprise:
generating a differential tree that indicates textual differences between the first text file and the second text file, the generated differential tree including the generated differential subtree that indicates the textual difference between the first subtree and second subtree.

24. A system comprising:
one or more processors; and
a memory storing instructions that, when executed by at least one processor among the one or more processors, cause the system to perform operations comprising:
accessing a first text document and a second text document both written in a coding language that is common to both;
determining the coding language is one of a plurality of programming languages, wherein each of the plurality of programming languages uniquely corresponds to at least one of a language specific specification or a language specific grammar stored in a storage device that is accessible by the one or more processors;
accessing the at least one of the specification or the grammar corresponding to the determined coding language, by the one or more processors;

based on the accessed at least one of the specification or the grammar:
  generating a first parse tree and a second parse tree by parsing the accessed first text document and the second text document, respectively, the first parse tree including a first plurality of subtrees, the second parse tree including a second plurality of subtrees; and
  determining that a first subtree in the first plurality of subtrees shares a classification with a second subtree in the second plurality of subtrees by classifying the first subtree and the second subtree based on a set of classifications that includes the shared classification;
selecting the first subtree and the second subtree for comparison to each other based on the determining that the first subtree shares the classification with the second subtree;
mapping each one of the set of classifications to one of a plurality of available comparison procedures that is applicable to the corresponding classification;
selecting a comparison procedure from the plurality of available comparison procedures applicable to the first subtree and the second subtree based on the classification shared by the first subtree and the second subtree; and
generating a differential subtree by performing the selected comparison procedure on the first subtree and the second subtree, the generated differential subtree indicating a textual difference between the first subtree and the second subtree.

25. The system of claim 24, wherein the operations further comprise:
generating a differential tree that indicates textual differences between the first text document and the second text document, the generated differential tree including the generated differential subtree that indicates the textual difference between the first subtree and the second subtree; and
generating a graphical representation of at least a portion of the generated differential tree, the generated graphical representation visually indicating the textual difference between the first subtree and the second subtree.

* * * * *